United States Patent
Ballantyne et al.

(10) Patent No.: US 8,374,078 B2
(45) Date of Patent: Feb. 12, 2013

(54) ACTIVE FAULT MANAGEMENT FOR METRO ETHERNET SERVICE OVER MPLS NETWORK

(75) Inventors: Andrew John Ballantyne, San Francisco, CA (US); Shun Jiang, San Jose, CA (US); Gil Mati Sheinfeld, Sunnyvale, CA (US)

(73) Assignee: CISCO TECHNOLOGY, Inc., San Jose, CA (US)

( * ) Notice: Subject to any disclaimer, the term of this patent is extended or adjusted under 35 U.S.C. 154(b) by 353 days.

(21) Appl. No.: 11/963,525

(22) Filed: Dec. 21, 2007

(65) Prior Publication Data
US 2009/0161533 A1  Jun. 25, 2009

(51) Int. Cl.
*G01R 31/08* (2006.01)
(52) U.S. Cl. .................... 370/218; 370/242; 370/254
(58) Field of Classification Search .................. None
See application file for complete search history.

(56) References Cited

U.S. PATENT DOCUMENTS

| | | | | |
|---|---|---|---|---|
| 6,151,304 | A * | 11/2000 | Doshi et al. | 370/238 |
| 6,981,174 | B1 * | 12/2005 | Hanning | 714/5 |
| 7,197,008 | B1 * | 3/2007 | Shabtay et al. | 370/218 |
| 7,545,736 | B2 * | 6/2009 | Dziong et al. | 370/217 |
| 7,769,290 | B2 * | 8/2010 | Smith | 398/5 |
| 8,107,363 | B1 * | 1/2012 | Saluja | 370/228 |
| 2003/0084367 | A1 * | 5/2003 | Suemura | 714/4 |
| 2004/0030924 | A1 * | 2/2004 | Griswold | 713/201 |
| 2006/0002409 | A1 * | 1/2006 | Menon et al. | 370/409 |
| 2006/0126496 | A1 * | 6/2006 | Filsfils et al. | 370/216 |
| 2006/0187854 | A1 * | 8/2006 | Booth et al. | 370/254 |
| 2007/0070975 | A1 * | 3/2007 | Otani et al. | 370/351 |

* cited by examiner

*Primary Examiner* — Chirag Shah
*Assistant Examiner* — Jenkey Van
(74) *Attorney, Agent, or Firm* — Patterson & Sheridan, LLP (57) ABSTRACT

In one embodiment, a technique for detecting a break in a pseudowire and automatic shutting down user network interface (UNI) ports affected by the break is provided. In response to the loss of connectivity on the shut down ports, customer edge devices may automatically switch over to redundant circuits (e.g., other UNI ports not affected by the break in the pseudowire) and establish a different pseudowire.

18 Claims, 6 Drawing Sheets

ACTIVE FAULT MANAGEMENT FOR METRO ETHERNET SERVICE OVER MPLS NETWORK

BACKGROUND OF THE INVENTION

1. Field of the Invention

Embodiments of the present invention generally relate to network traffic management.

2. Description of the Related Art

Service providers often offer Layer 2 services over Internet Protocol (IP) based Multi-Protocol Label Switching (MPLS) network cores. As an example, a service provider may offer Metro Ethernet services that provide customers emulated Ethernet connections between distributed customer sites, such as different offices of a business or different campuses of a school or university. The customers of such service providers often require redundant links to the same MPLS core, or maybe even to another Service Provider.

Unfortunately, in the event of a transport failure, identifying and closing customer connections that are affected is a complex process. Further, shutting down affected connections and switching over to redundant connections is a time consuming process that is performed manually.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Embodiments of the present invention provide active fault management and automatic switchover to redundant paths for applications, such as Metro Ethernet Services. For some embodiments, a fault management system that monitors a network for alarms may take action in the network designed to automatically shut down interfaces affected by a failed transport and cause a switch over to a redundant link.

For some embodiments, the fault management system may detect a break in a pseudowire, determine which customer edge ports in the network are affected by the break, and shutdown the affected ports. In response, the customer edge sites may detect the loss in connectivity resulting from the shutdown of the affected ports and automatically switch over to backup (redundant) circuits. For some embodiments, the fault management system may maintain a database of network topology that allows the customer edge ports that are affected by a transport failure to be identified.

The term pseudowire (PW) generally refers to an emulation of a native service over a Packet Switched Network (PSN), for example, using various encapsulation techniques. A pseudowire effectively emulates the native service as if devices on each end were connected by a single "wire" carrying the native service. The native service may be, for example, ATM, Frame Relay, Ethernet, low-rate TDM, or SONET/SDH. The PSN may be, for example, an MPLS, IP (either IPv4 or IPv6), or L2TPv3 network. In some cases, a pseudowire may provide edge-to-edge connection across a service provider network.

As a result, devices connected by the pseudowire may act as if they are connected via a local Ethernet connection, while they may, in fact be remotely located. Thus, the use of pseudowire connections provides a great deal of flexibility in deploying remote services. However, when a component along a path that forms a pseudowire fails (causing a "break" in the pseudowire) a number of devices can be affected.

As used herein, the term User Network Interface (UNI) generally refers to a point of demarcation between the responsibility of the service provider and the responsibility of the subscriber. As used herein, the term User-Facing provider edge (U-PE) generally refers to the location of a UNI port attachment to customer edge equipment resides, while the term Network-Facing Provider Edge (N-PE) generally refers to the location of a connection to the core.

As used herein, the term Metro Ethernet generally refers to a network based on the Ethernet standard and which covers a metropolitan area. Such networks are commonly used as a metropolitan access network to connect subscribers and businesses to a Wide Area Network (WAN), such as the Internet. Entities, such as businesses and schools, can also use Metro Ethernet to connect branch sites to their own Intranets.

The concept of a Metro Ethernet Virtual Connection (EVC) is defined by MEF 10. A typical service provider Metro Ethernet network is a collection of interconnected Layer 2 or 3 switches and/or routers in any suitable topology (e.g., a ring, hub-and-spoke, full mesh, or partial mesh). The network typically has a hierarchy with a core, distribution and access components. Typically, the core is an existing IP/MPLS backbone, but may migrate to other forms of transport.

In accordance with embodiments of the present invention, a fault management system may be responsible for both determining that a service (e.g., a Metro Ethernet Service) is experiencing a transport problem across its core and taking action designed to cause customer edge components to switch to backup circuits (e.g., to a different UNI port), effectively switching to a different pseudowire. Such actions may include sending messages to disable (bring down) a UNI port affected by a broken pseudowire.

Such a fault management system may work with point-to-point EVC over IP/MPLS core to provide the services described herein. The point-to-point EVC, sometimes referred to as a Virtual Private Wire Service (VPWS), typically defines two types of Metro Ethernet services: Ethernet Relay Service (ERS) with one VLAN and Ethernet Wire Service (EWS).

An Exemplary Network Architecture

Figure 1:
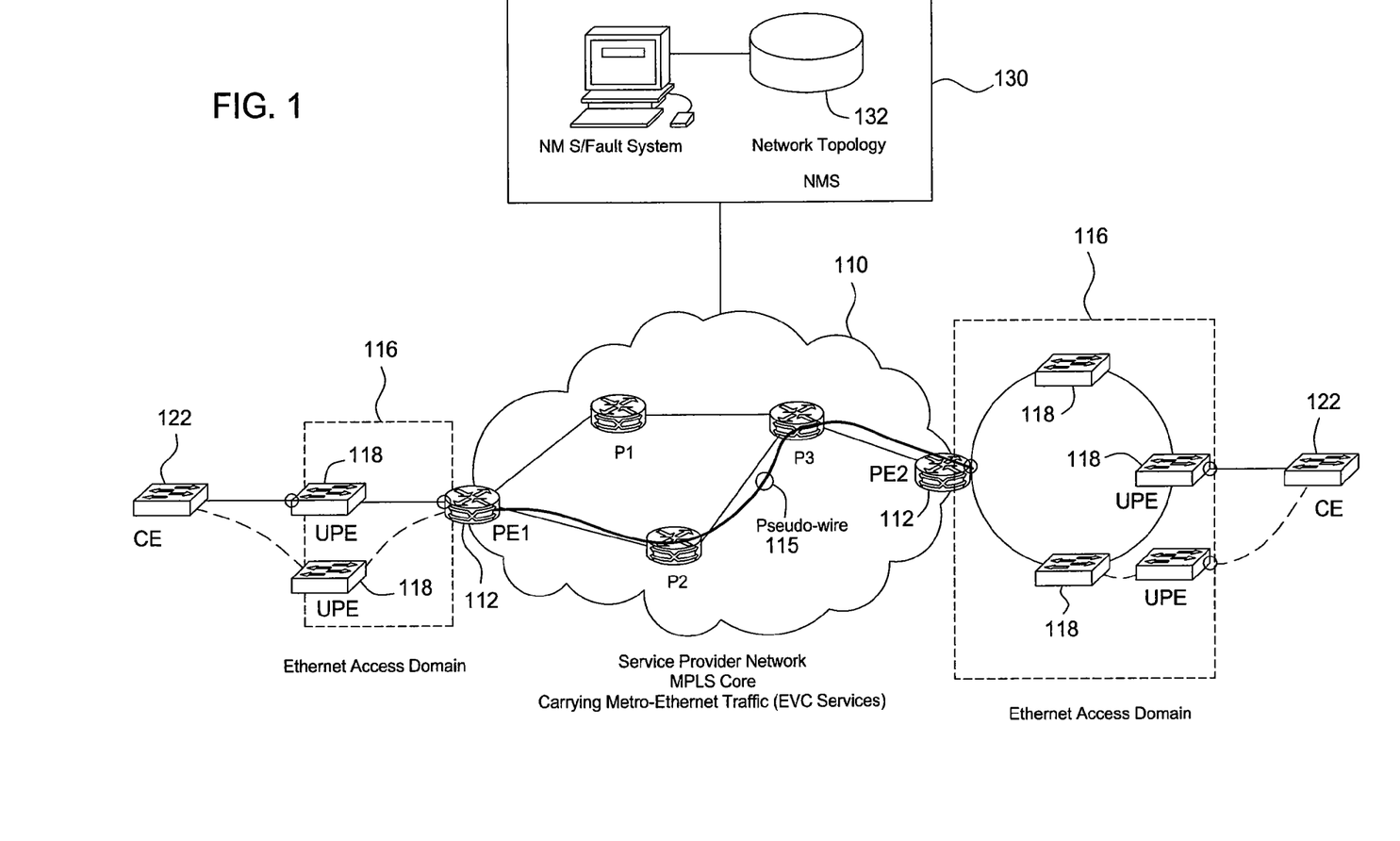
FIG. 1 illustrates an example network topology in accordance with some embodiments of the present invention.

FIG. 1 illustrates an example network architecture in which embodiments of the present invention may be utilized. The architecture may enable services, such as Metro Ethernet services, or emulation of some other type of transport services (e.g., Frame Relay or ATM), to connect remotely located customer sites. In addition to supporting a single service, the architecture may also allow for the interworking of any heterogeneous combination of services, for example, between Ethernet and Frame Relay or ATM services, supporting the transport of customer traffic from a wide variety of sources. As an example, there may be Ethernet service on the customer side of the core and ATM on the service provider side.

The architecture generally includes a service provider network 110 that routes network traffic (e.g., of data, voice, and the like) between various customer sites 120. While not shown, those skilled in the art will appreciate that the provider network 110 may also include a "fabric" of intermediate network devices, such as switches and routers, to route and support traffic between the PE routers 112. The sites 120 may include sites from different entities (e.g., schools or businesses), as well as multiple sites from the same entity (e.g., regional branch offices or headquarters of a business or different campuses of a school).

For some embodiments, the service provider network 110 may be a Multiprotocol Label Switching (MPLS) network that forwards internet protocol (IP) traffic using labels. These labels may instruct the routers and the switches in the provider network 110 where to forward packets as they are routed between PE routers 112 en route to CEs 122 at the customer sites 120 based on pre-established IP routing information. Further, for some embodiments, customer sites may be linked through more than one service provider network, for example, to provide redundancy for critical applications.

Access domains 116 may be established, that serve as an interface between customer sites and the service provider network 110. For example, CE routers 122 may connect, via an Ethernet connection (e.g., Copper-100BASE-TX, or fiber-100BASE-FX), to UNI ports of user facing PE (U-PEs) routers 118 that receive and transport customers' Ethernet packets over the (e.g., MPLS) service provider network 110. The UNI ports may comprise a variety of different type access circuits, such as Ethernet of Frame Relay and the same architecture may support both.

As illustrated, the illustrated architecture thus enables the establishment of a pseudowire 115 that provides emulation of services between customer sites. As illustrated, a CE 122 may establish redundant paths to the service provider network 110, for example, by maintaining inactive links to UNI ports in the U-PEs. In the illustrated figure, an inactive link is shown as a dashed line. As will be described in greater detail below, in the event a transport failure causes a failure of service (a "break" in the pseudowire), affected UNI port connections may be brought down, prompting an automatic switchover at the CE to redundant links.

For example, a network management system (NMS) 130 may be configured to detect a break in the pseudowire 115 and identify which UNI ports are affected by correlation using network topology information. In response to detecting a break, the NMS 130 may dispatch messages to the U-PEs designed to shut down the affected ports. As a result, the CEs may automatically switch over to a different UNI port connection, establishing a different pseudowire.

In general, the NMS 130 may be configured to monitor performance of the provider network 110, as traffic is exchanged over the network. The NMS 130 may be implemented, for example, at a network operation center. The NMS 130 may poll components in the provider network 110 and/or may communicate with agents (e.g., network probes) deployed in the provider network 110 in an effort to detect breaks in a pseudowire.

For example, a network probe deployed at a device along a pseudowire may be configured to automatically send a trap to the NMS 130 upon detection of a significant event, such as a loss in connectivity or the reduction in service level above or below specified threshold amount. In response, the NMS 130 may consult a network topology database 132 in an effort to identify UNI ports affected by the break.

For some embodiments, the network topology may be discovered utilizing a specialized protocol, such as the Cisco Discovery Protocol (CDP) established by Cisco Systems Inc., that allows network devices (switches, routers, access servers, bridges, and the like) to advertise its existence to other devices and receive information about other devices on the same network. Topology information gathered in the discovery phase may be used to populate the network management database 132 at NMS 130. This topology information may include information about pseudowire and UNI port relationships that may be used to automatically shut down UNI ports affected by a break in a pseudowire.

Figure 2:
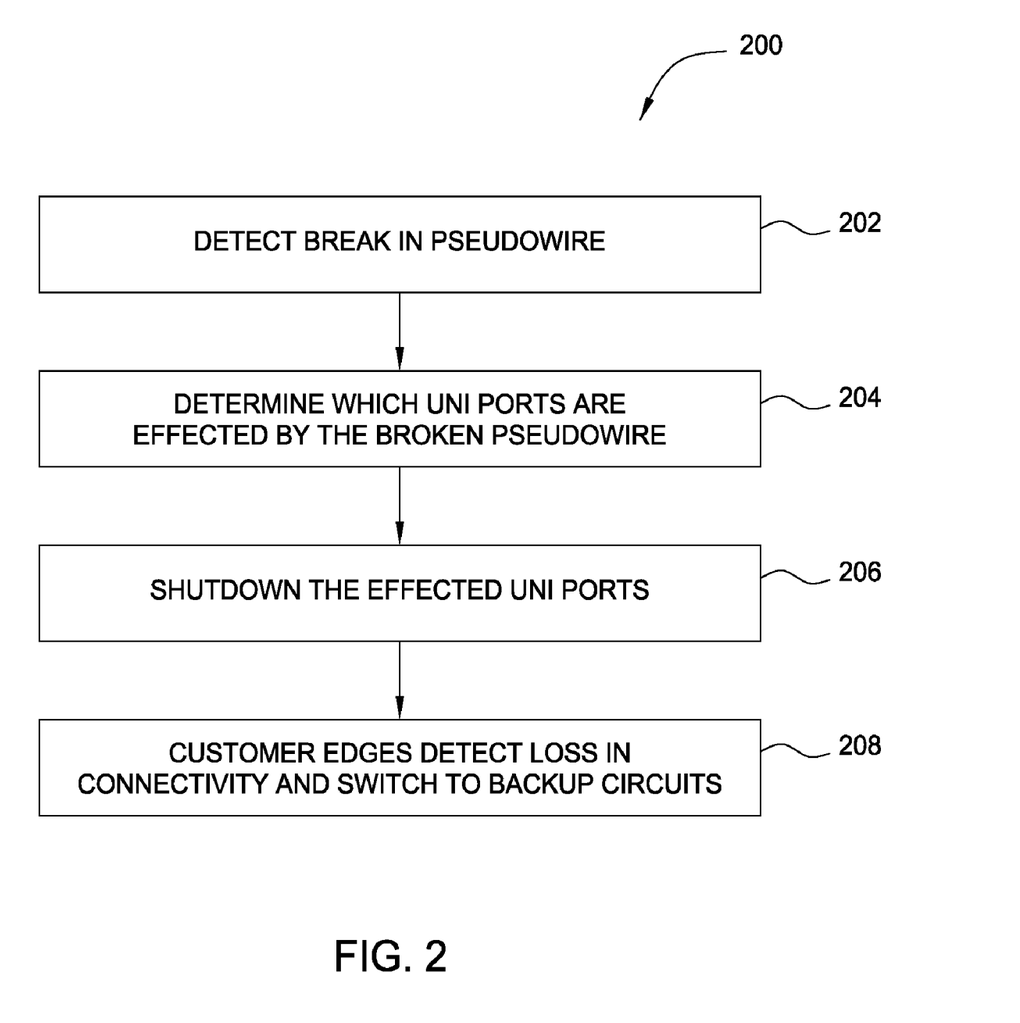
FIG. 2 illustrates a flow diagram of example operations in accordance with some embodiments of the present invention.

FIG. 2 illustrates example operations 200, that may be performed to automatically shutdown UNI ports affected by a break in a pseudowire and prompt a switchover to a backup link. Some of the operations 200 (e.g., operations 202-206) may be performed by the NMS 130, while other operations (e.g., operation 208) may be performed by a CE router 122. The operations 200 may be described with reference to FIGS. 3A-3D, which illustrate different states of the Metro Ethernet of FIG. 1 at different states.

Figure 3A:
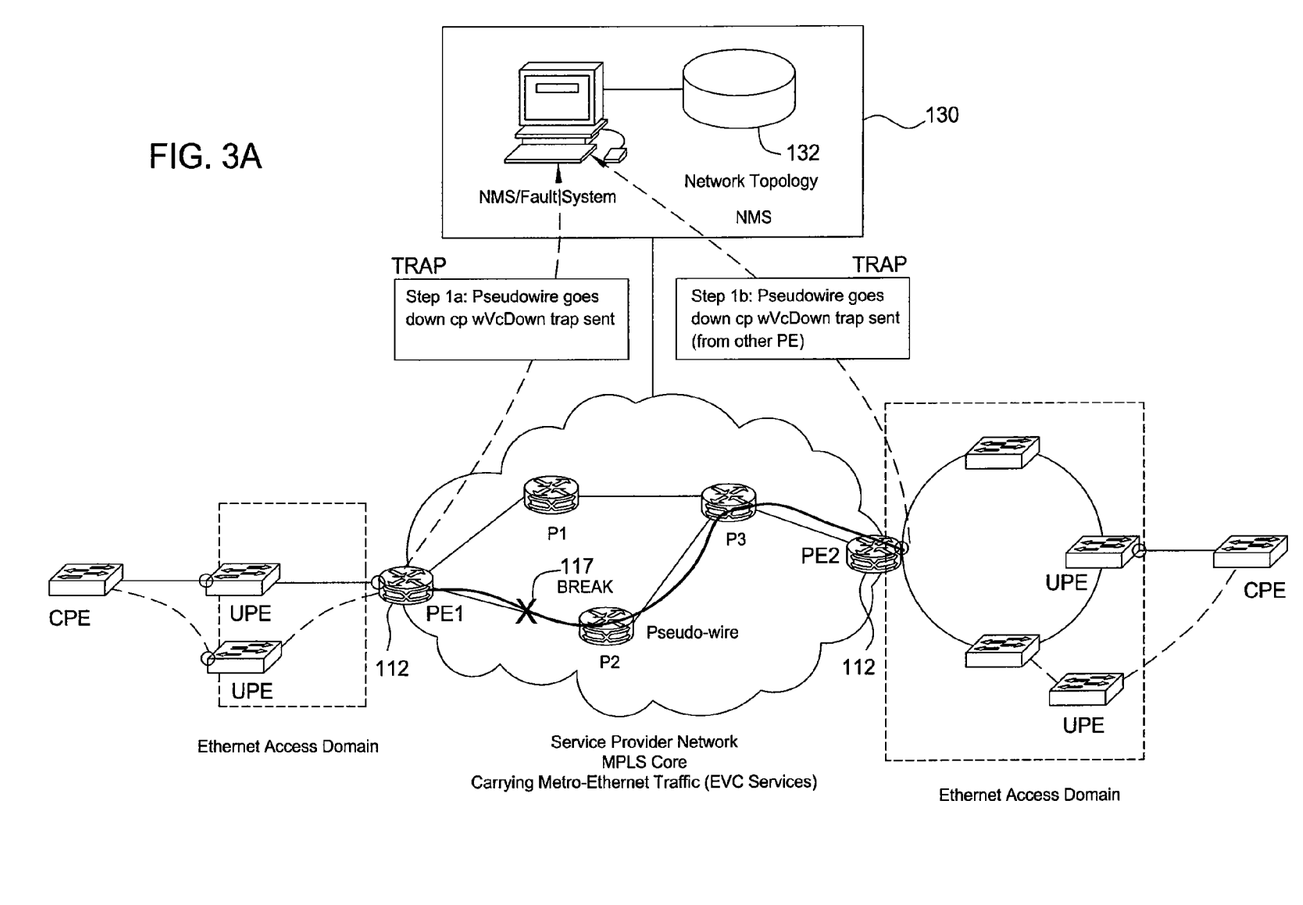
FIGS. 3A-3D illustrate example data flow in accordance with some embodiments of the present invention.

The operations begin, at 202, by detecting a break in a pseudowire. For example, as illustrated in FIG. 3A, a break 117 in the pseudowire 115 may be detected by PEs 112. In response, the affected PEs may send traps to the NMS 130. Based on the receiving of these traps, the NMS 130 can determine that a Pseudo-wire is up or down. For some embodiments, the state of a pseudo-wire may also be determined by polling.

Figure 3B:
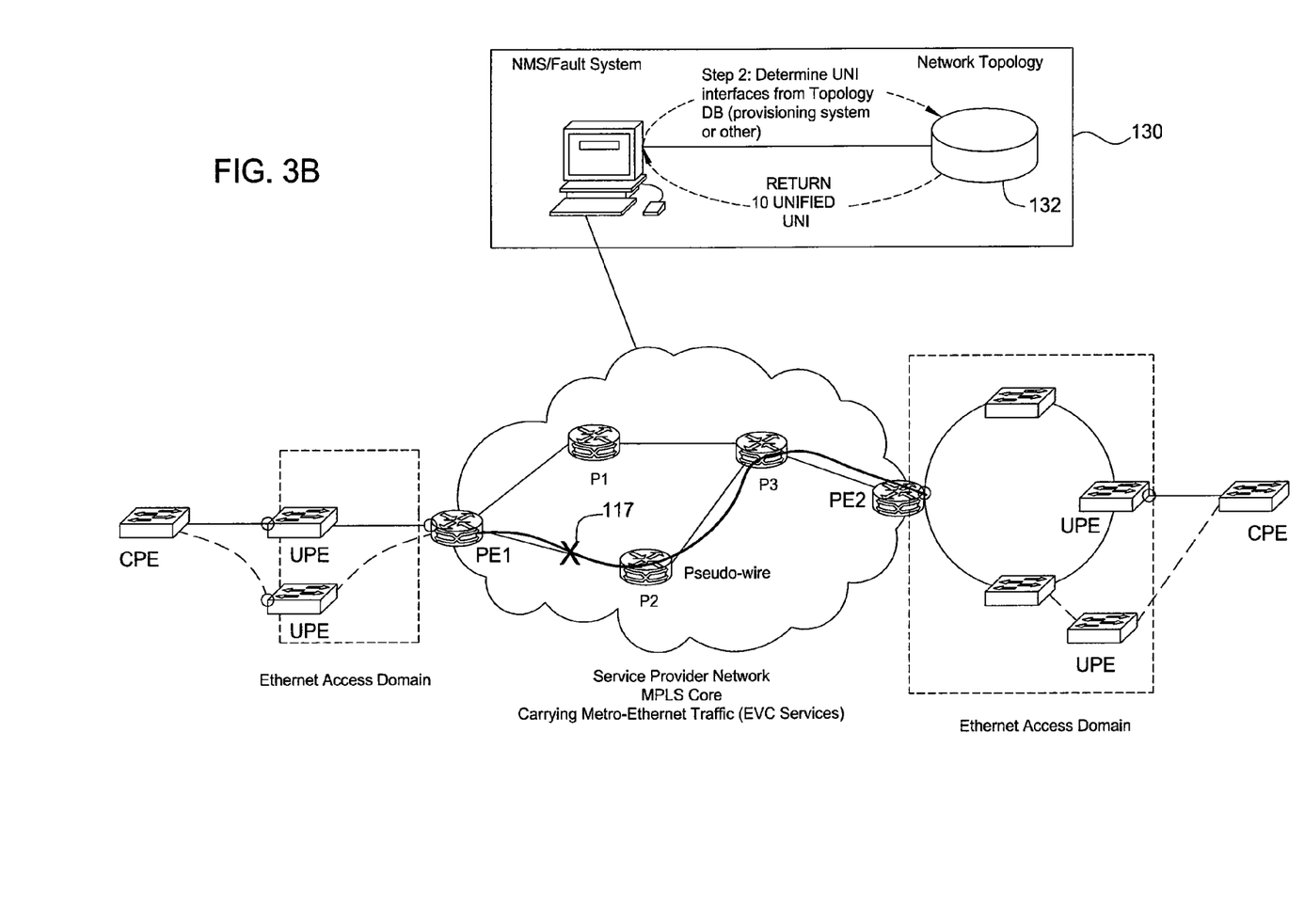

At 204, the NMS 130 determines which UNI ports are affected by the broken pseudowire. For example, with knowledge of the topology of the service architecture (e.g., gained from provisioning or through discovery), the NMS 130 may be able to determine which U-PE/UNI port is actually using the broken pseudo-wire. As illustrated in FIG. 3B, the NMS 130 may access the topology database 132 to access topology information and determine which UNI ports in the network are affected by the identified pseudowire.

Figure 3C:
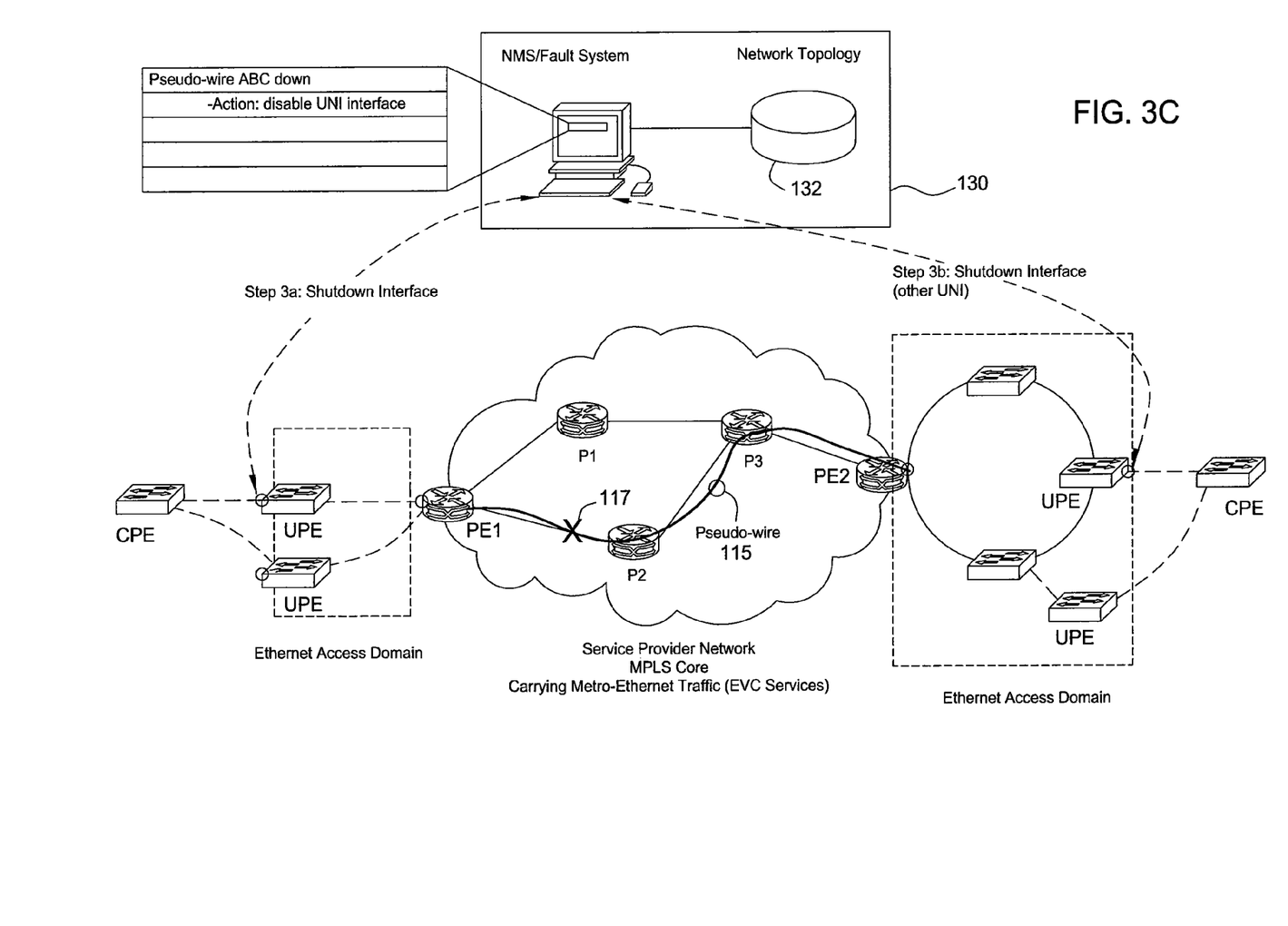
Figure 3D:
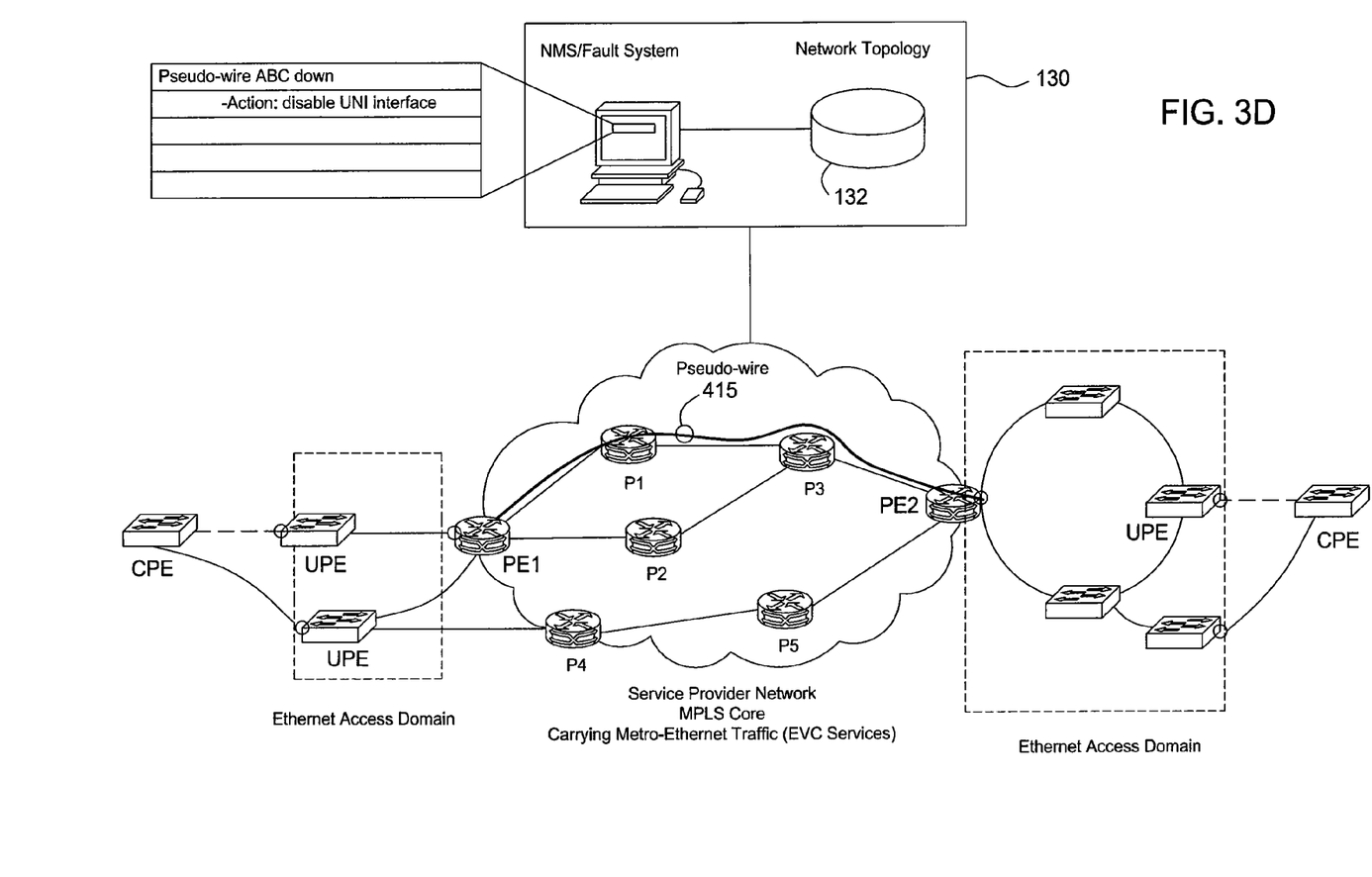

At 206, the NMS 130 shuts down the affected UNI ports. For example, as illustrated in FIG. 3C, the NMS 130 may be configured to automatically send a command to the U-PEs on which the affected UNI ports reside, instructing them to shut down those ports, resulting in a loss of connectivity between the corresponding CEs (as indicated by the dashed lines). Because the underlying service is no longer available to the customers on these ports due to the transport failure 117, shutting these ports down may allow the CEs to switch over to redundant circuits with minimal impact to the customer.

At 208, in response to detecting the loss in connectivity, the CEs may automatically switch over to backup circuits. For example, as illustrated to FIG. 3D, the CEs may automatically switch over to the redundant links established via connection with different UNI ports that are not affected by the transport failure 117. With these redundant links active (as indicated by the change to solid lines), a different pseudowire 415 that avoids the transport failure 117 may be established between the CEs.

By automatically detecting transport failures and taking action to shut down affected UNI ports, the need for customers to manually re-configure their switches in the event of a connectivity outage across the network core. Shutting down the affect ports prompts an automatic switch over to a redundant link.

While the foregoing is directed to embodiments of the present invention, other and further embodiments of the invention may be devised without departing from the basic scope thereof, and the scope thereof is determined by the claims that follow.

What is claimed is:

1. A method comprising:
    collecting, at a centralized fault management system, data related to a transport failure in a first path of a packet-switched network used to establish a first pseudo-wire connection between at least two devices, wherein the data is collected by at least one of (i) polling components in the packet-switched network and (ii) communicating with network probes deployed in the packet-switched network;
    determining, at the centralized fault management system, one or more user network interface (UNI) ports that are affected by the transport failure based on network topology information, wherein the one or more UNI ports are used to connect the at least two devices to the packet-switched network, and wherein the UNI ports are associated with an Ethernet Access Domain in the packet-switched network between responsibilities of a service provider network and responsibilities of a subscriber network; and
    sending, from the centralized fault management system, one or more messages to one or more network devices on which the affected UNI ports reside based on the transport failure in the first path, wherein the one or more network devices are configured to, responsive to receiving the one or more messages, disable one or more of the affected UNI ports, and wherein the one or more network devices are further configured to switch over to a backup pseudo-wire connection upon disabling the affected UNI ports, comprising:
    identifying one or more different UNI ports on the one or more network devices for use in establishing the backup pseudo-wire connection, wherein the one or more different UNI ports are maintained in an inactive state while the first pseudo-wire connection is active; and
    triggering a switch over of traffic on the first pseudo-wire connection to the backup pseudo-wire connection using the identified one or more different UNI ports to maintain the connection between the at least two devices, and
    wherein the one or more of the affected UNI ports and the one or more different UNI ports are included in one or more user-facing provider edges that form a connection to customer edge devices maintained by one or more subscribers.

2. The method of claim 1, wherein determining UNI ports used to connect the at least two devices to the network that are affected by the transport failure comprises:
    querying a database containing network topology information.

3. The method of claim 2, further comprising:
    discovering the network topology information through messages sent from components in the network; and
    populating the database with the discovered information.

4. The method of claim 1, wherein the at least two devices comprise at least one customer edge device.

5. The method of claim 1, wherein the UNI ports comprise one or more Ethernet UNI ports.

6. The method of claim 1, wherein the UNI ports comprise at least one of: one or more Asynchronous Transfer Mode (ATM) UNI ports and one or more Frame Relay UNI ports.

7. The method of claim 1, wherein the network comprises a Multi-Protocol Label Switching (MPLS) network.

8. A network management system, comprising:
    a database for storing topology information for a network used to establish a pseudo-wire connection between at least two devices; and
    a processor configured to execute:
    fault management logic configured to detect a transport failure in a first path of the network used to establish a first pseudo-wire connection between at least two customer edge devices maintained by one or more subscribers, wherein the transport failure is detected based on at least one of (i) polling components in the network and (ii) communicating with network probes deployed in the network;
    correlation logic configured to determine one or more user network interface (UNI) ports that are affected by the transport failure based on the stored topology information, wherein the one or more UNI ports are used to connect the customer edge devices to the network, wherein the UNI ports are associated with an Ethernet Access Domain in the network between responsibilities of a service provider network and responsibilities of a subscriber network; and
    failover logic configured to send one or more messages to one or more network devices on which the affected UNI ports reside based on the transport failure in the first path, wherein the one or more network devices are configured to, responsive to receiving the one or more messages, shut down one or more of the affected UNI ports, wherein the failover logic includes a triggering logic for, upon disabling the one or more affected UNI ports, switching over to a backup pseudo-wire connection, comprising:
    logic configured to identify one or more different UNI ports on the one or more network devices for use in establishing the backup pseudo-wire connection, wherein the one or more different UNI ports are maintained in an inactive state while the first pseudo-wire connection is active; and
    logic configured to trigger a switch over of traffic on the first pseudo-wire connection to the backup pseudo-wire connection using the identified one or more different UNI ports to maintain the connection between the at least two customer edge devices, and
    wherein the one or more of the affected UNI ports and the one or more different UNI ports are included in one or more user-facing provider edges that form a connection to the customer edge devices maintained by the one or more subscribers.

9. The network management system of claim 8, wherein the correlation logic is configured to determine affected UNI ports by querying a network topology database.

10. The network management system of claim 8, wherein the at least two devices comprise at least one customer edge device.

11. The network management system of claim 8, wherein the UNI ports comprise one or more Ethernet UNI ports.

12. The network management system of claim 8, wherein the first set of UNI ports comprises at least one of: one or more Asynchronous Transfer Mode (ATM) UNI ports and one or more Frame Relay UNI ports.

13. A system, comprising:
    user network interface (UNI) ports for connecting devices to a packet switched network used to establish a first pseudo-wire connection between at least two devices; and
    a network management system having:
    fault management logic configured to detect a transport failure in a first path of the network used to establish the first pseudo-wire connection, wherein the transport failure is detected based on at least one of (i) polling components in the network and (ii) communicating with network probes deployed in the network, correlation logic configured to identify one or more of the UNI ports that are affected by the transport failure, wherein the one or more UNI ports are used to connect the at least two devices to the network, wherein the UNI ports are associated with an Ethernet Access Domain in the network between responsibilities of a service provider network and a responsibilities of a subscriber network, and failover logic configured to send one or more messages to one or more network devices on which the affected UNI ports reside based on the transport failure in the first path, wherein the one or more network devices are configured to, responsive to receiving the one or more messages, shut down one or more of the affected UNI ports, and wherein the one or more network devices are further configured to switch over to a backup pseudo-wire connection upon disabling the affected UNI ports, comprising:

identifying one or more different UNI ports on the one or more network devices for use in establishing the backup pseudo-wife connection, wherein the one or more different UNI ports are maintained in an inactive state while the first pseudo-wire connection is active;

triggering a switch over of traffic on the first pseudo-wire connection to the backup pseudo-wire connection using the identified one or more different UNI ports to maintain the connection between the at least two devices, and wherein the one or more of the affected UNI ports and the one or more different UNI ports are included in one or more user-facing provider edges that form a connection to the customer edge devices maintained by one or more subscribers.

14. The system of claim 13, wherein the correlation logic is configured to determine affected UNI ports by querying a network topology database.

15. The system of claim 13, wherein the at least two devices comprise at least one customer edge device.

16. The system of claim 13, wherein the packet switched network is a Multi-Protocol Label Switching (MPLS) network.

17. The system of claim 13, wherein the UNI ports comprise one or more Ethernet UNI ports.

18. The system of claim 13, wherein the UNI ports comprise at least one of: one or more Asynchronous Transfer Mode (ATM) UNI ports and one or more Frame Relay UNI ports.

* * * * *